United States Patent
Lee et al.

(10) Patent No.: US 12,389,261 B2
(45) Date of Patent: Aug. 12, 2025

(54) METHOD AND APPARATUS FOR INTERFERENCE MANAGEMENT

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 18/047,993

(22) Filed: Oct. 19, 2022

(65) Prior Publication Data

US 2023/0139602 A1   May 4, 2023

Related U.S. Application Data

(60) Provisional application No. 63/273,708, filed on Oct. 29, 2021.

(51) Int. Cl.
*H04W 28/02* (2009.01)
*H04L 27/20* (2006.01)
*H04L 27/22* (2006.01)

(52) U.S. Cl.
CPC ......... *H04W 28/0236* (2013.01); *H04L 27/20* (2013.01); *H04L 27/22* (2013.01)

(58) Field of Classification Search
CPC ..... H04W 28/0236; H04L 27/20; H04L 27/22
See application file for complete search history.

(56) References Cited

U.S. PATENT DOCUMENTS

| | | |
|---|---|---|
| 2017/0359108 A1 | 12/2017 | Abdel Khalek et al. |
| 2020/0259547 A1 | 8/2020 | Castaneda et al. |
| 2021/0126675 A1 | 4/2021 | Lin et al. |
| 2021/0258059 A1 | 8/2021 | Onggosanusi et al. |
| 2021/0289383 A1 | 9/2021 | Marinier et al. |
| 2022/0271802 A1* | 8/2022 | Lee .................. H04B 17/11 |

FOREIGN PATENT DOCUMENTS

| | | | |
|---|---|---|---|
| CA | 3035020 A1 * | 5/2019 | ........... H04B 17/309 |
| WO | 2020165494 A1 | 8/2020 | |

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.

(Continued)

*Primary Examiner* — Duc C Ho

(57) ABSTRACT

Methods and apparatuses for interference management in a wireless communication system. A method for operating a user equipment (UE) includes receiving configuration information about I. I is interference information for interfering $N_{int}$ remote radio heads (RRHs), where $N_{int} \leq N-1$. The configuration information indicates a number of RRHs, $N>1$. The method further includes determining, based on the interference information I, a downlink (DL) spatial filter using P antenna ports, where $P>1$, and receiving DL data using the determined DL spatial filter.

20 Claims, 9 Drawing Sheets

(56) References Cited

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.

"LTE; Evolved Universal Terrestrial Radio Access (E-UTRA) Physical layer procedures (3GPP TS 36.213 version 16.4.0 Release 16)", ETSI TS 136 213 V16.4.0, Feb. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.

"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.

"5G; NR; Physical channels and modulation (3GPP TS 38.211 version 16.4.0 Release 16)", ETSI TS 138 211 V16.4.0, Jan. 2021, 137 pages.

"5G; NR; Multiplexing and channel coding (3GPP TS 38.212 version 16.4.0 Release 16)", ETSI TS 138 212 V16.4.0, Jan. 2021, 155 pages.

"5G; NR; Physical layer procedures for control (3GPP TS 38.213 version 16.4.0 Release 16)", ETSI TS 138 213 V16.4.0, Jan. 2021, 185 pages.

"5G; NR; Physical layer procedures for data (3GPP TS 38.214 version 16.4.0 Release 16)", ETSI TS 138 214 V16.4.0, Jan. 2021, 173 pages.

"5G; NR; Physical layer measurements (3GPP TS 38.215 version 16.4.0 Release 16)", ETSI TS 138 215 V16.4.0, Jan. 2021, 31 pages.

"5G; NR; Medium Access Control (MAC) protocol specification (3GPP TS 38.321 version 16.3.0 Release 16)", ETSI TS 138 321 V16.3.0, Jan. 2021, 158 pages.

"5G; NR; Radio Resource Control (RRC); Protocol specification (3GPP TS 38.331 version 16.3.1 Release 16)", ETSI TS 138 331 V16.3.1, Jan. 2021, 916 pages.

International Search Report and Written Opinion issued Feb. 2, 2023 regarding International Application No. PCT/KR2022/016729, 7 pages.

Extended European Search Report issued Aug. 26, 2024 regarding Application No. 22887708.0, 6 pages.

* cited by examiner

METHOD AND APPARATUS FOR INTERFERENCE MANAGEMENT

CROSS-REFERENCE TO RELATED APPLICATIONS AND CLAIM OF PRIORITY

The present application claims priority to U.S. Provisional Patent Application No. 63/273,708, filed on Oct. 29, 2021. The content of the above-identified patent document is incorporated herein by reference.

TECHNICAL FIELD

The present disclosure relates generally to wireless communication systems and, more specifically, the present disclosure relates to interference management in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to interference management in a wireless communication system.

In one embodiment, a user equipment (UE) is provided. The US includes a transceiver configured to receive configuration information about I. I is interference information for interfering $N_{int}$ remote radio heads (RRHs), where $N_{int} \leq N-1$. The configuration information indicates a number of RRHs, N>1. The UE further includes a processor operably coupled to the transceiver. The processor is configured to, based on the interference information I, determine a downlink (DL) spatial filter using P antenna ports, where P>1. The transceiver is further configured to receive DL data using the determined DL spatial filter.

In another embodiment, a base station (BS) is provided. The BS includes a transceiver configured to transmit configuration information about I. I is interference information for interfering $N_{int}$ RRHs, where $N_{int} \leq N-1$. The configuration information indicates a number of RRHs, N>1. The BS further includes a processor operably coupled to the transceiver. The processor is configured to, based on the interference information I, determine a DL spatial filter using P antenna ports, where P>1. The transceiver is further configured to transmit DL data for reception according to the determined DL spatial filter.

In yet another embodiment, a method for operating a UE is provided. The method includes receiving configuration information about I. I is interference information for interfering $N_{int}$ RRHs, where $N_{int} \leq N-1$. The configuration information indicates a number of RRHs, N>1. The method further includes determining, based on the interference information I, a DL spatial filter using P antenna ports, where P>1, and receiving DL data using the determined DL spatial filter.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
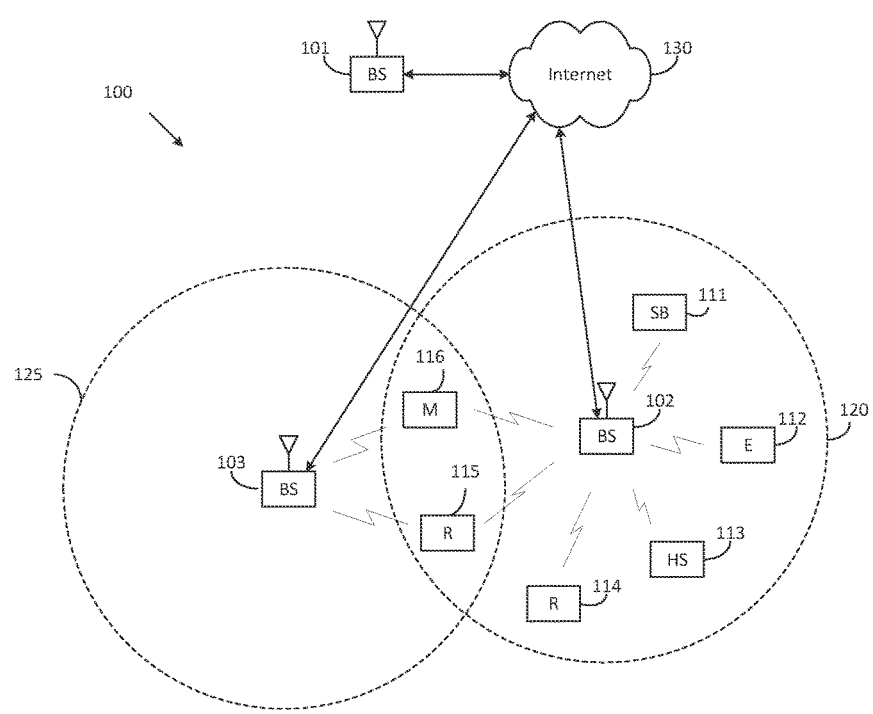
FIG. 1 illustrates an example of wireless network according to embodiments of the present disclosure.

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v16.4.0, "E-UTRA, Physical channels and modulation"; 3GPP TS 36.212 v16.4.0, "E-UTRA, Multiplexing and Channel coding"; 3GPP TS 36.213 v16.4.0, "E-UTRA, Physical Layer Procedures"; 3GPP TS 36.321 v16.3.0, "E-UTRA, Medium Access Control (MAC) protocol specification"; 3GPP TS 36.331 v16.3.0, "E-UTRA, Radio Resource Control (RRC) Protocol Specification"; 3GPP TS 38.211 v16.4.0, "NR, Physical channels and modulation"; 3GPP TS 38.212 v16.4.0, "NR, Multiplexing and Channel coding"; 3GPP TS 38.213 v16.4.0, "NR, Physical Layer Procedures for Control"; 3GPP TS 38.214 v16.4.0, "NR, Physical Layer Procedures for Data"; 3GPP TS 38.215 v16.4.0, "NR, Physical Layer Measurements"; 3GPP TS 38.321 v16.3.0, "NR, Medium Access Control (MAC) protocol specification"; and 3GPP TS 38.331 v16.3.1, "NR, Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
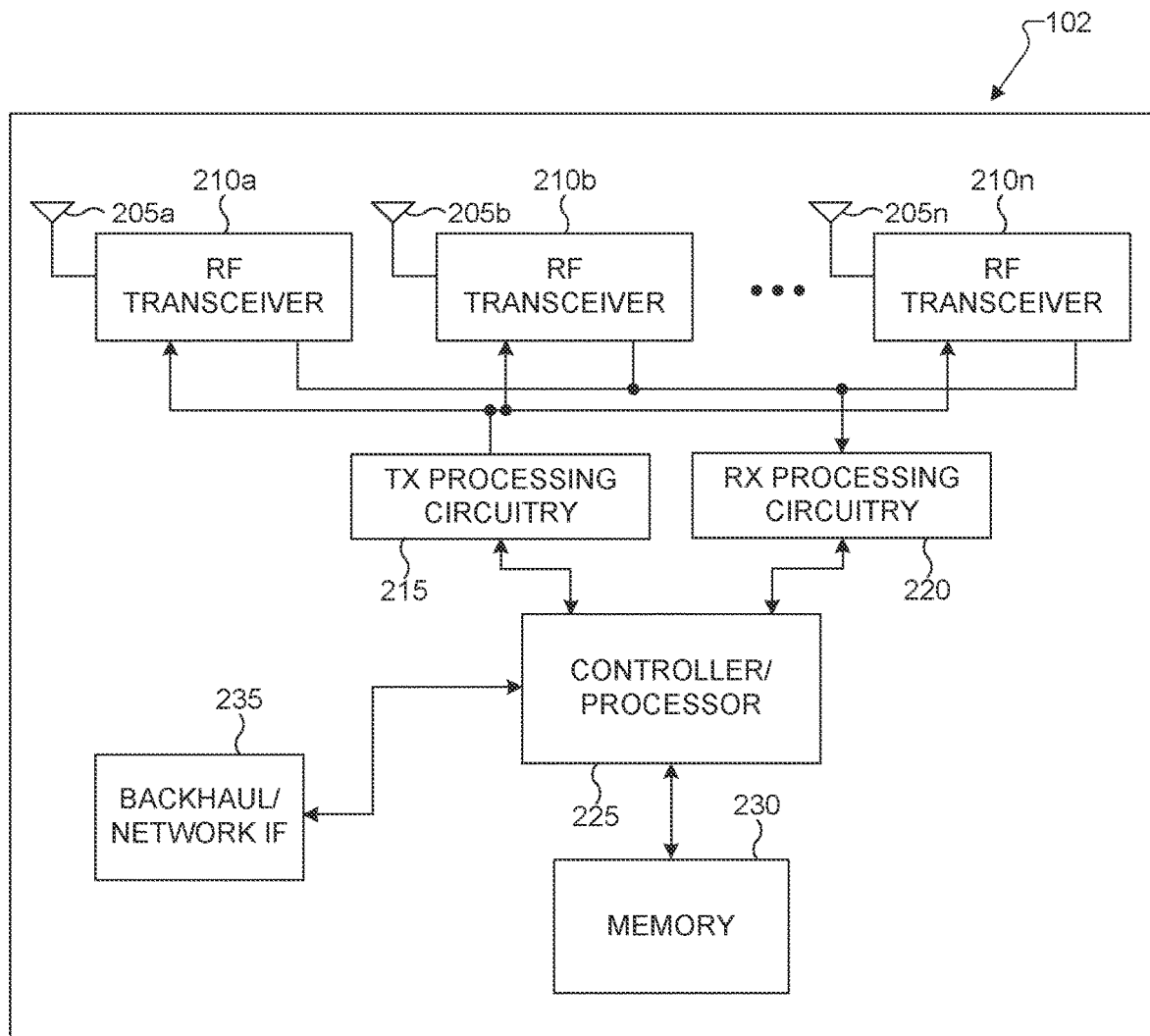
FIG. 2 illustrates an example of a base station (gNB) according to embodiments of the present disclosure.
Figure 3:
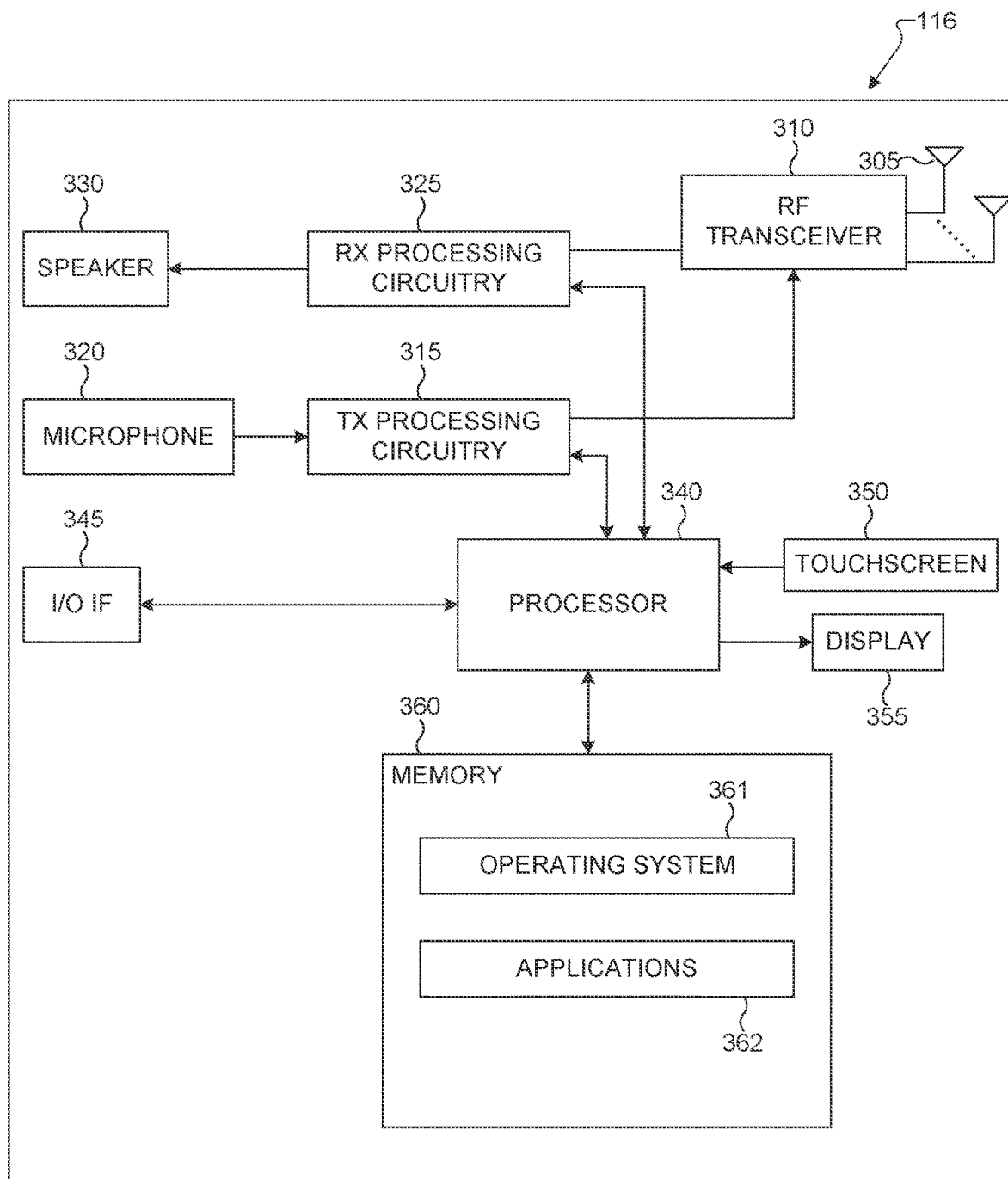
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for interference management in a wireless communication system. In certain embodiments, and one or more of the gNBs 101-103 includes circuitry, programing, or a combination thereof, for interference management in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support interference management in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for interference management in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
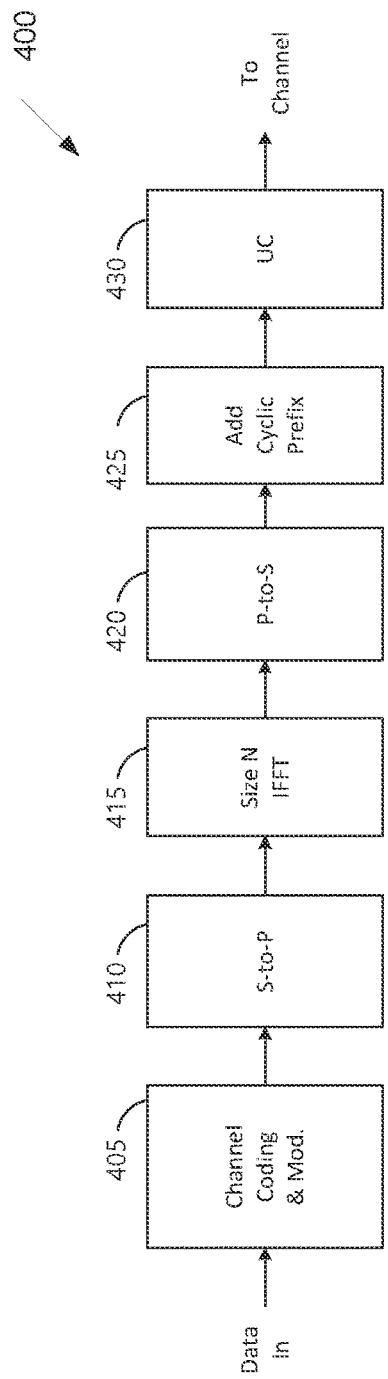
FIGS. 4 and 5 illustrate example of wireless transmit and receive paths according to this disclosure.
Figure 5:
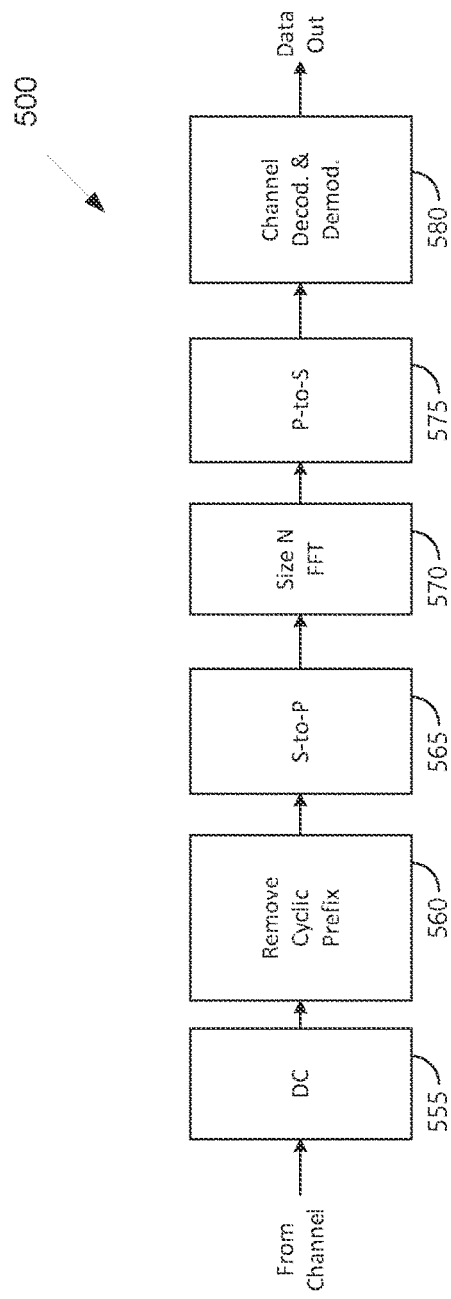

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel.

Rel.1.14 LTE and Rel.1.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
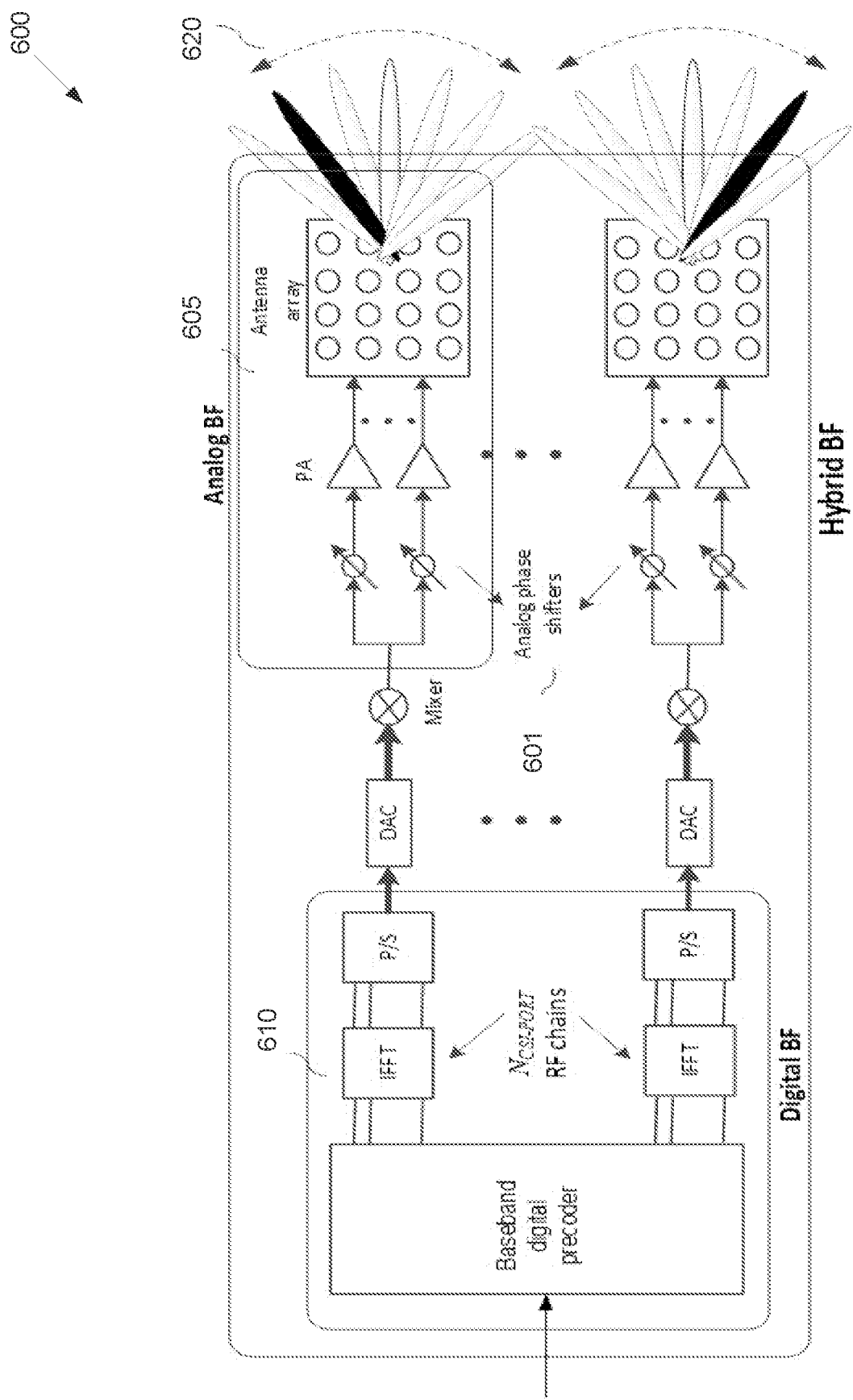
FIG. 6 illustrates an example of antenna structure according to embodiments of the present disclosure.

FIG. 6 illustrates an example antenna structure 600 according to embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

At lower frequency bands such as <1 GHz, on the other hand, the number of antenna elements may not be large in a given form factor due to the large wavelength. As an example, for the case of the wavelength size (λ) of the center frequency 600 MHz (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panel(s) at gNB to support a large number of antenna ports such as 32 CSI-RS ports becomes very large in such low frequency bands, and it leads the difficulty of deploying 2-D antenna element arrays within the size of a conventional form factor. This results in a limited number of CSI-RS ports that can be supported at a single site and limits the spectral efficiency of such systems.

One possible approach to resolving the issue is to form multiple antenna panels/remote radio heads (RRHs) with a small number of antenna ports instead of integrating all of the antenna ports in a single panel (or at a single site) and to distribute the multiple panels in multiple locations/sites (or RRHs).

Figure 7:
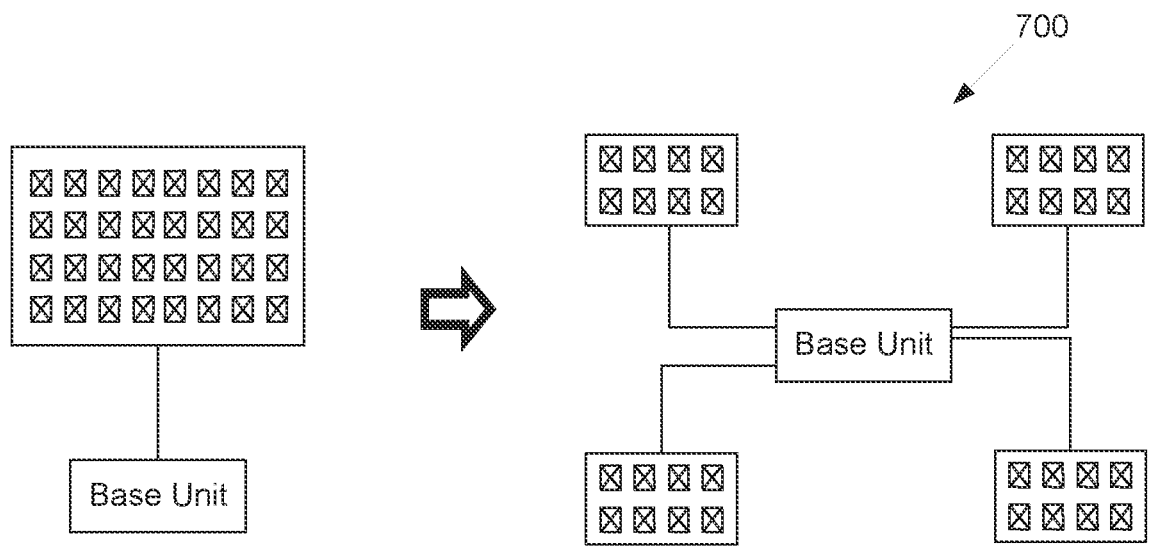
FIG. 7 illustrates an example of concept of distributed multiple-input multiple-output (MIMO) according to embodiments of the present disclosure.

FIG. 7 illustrates an example of concept of distributed MIMO 700 according to embodiments of the present disclosure. An embodiment of the concept of distributed MIMO 700 shown in FIG. 7 is for illustration only.

This approach, concept of distributed MIMO (D-MIMO), is shown in FIG. 7. The multiple antenna panels at multiple locations can still be connected to a single base unit, and thus the signal transmitted/received via multiple distributed panels can be processed in a centralized manner through the single base unit, as illustrated in FIG. 8.

Figure 8:
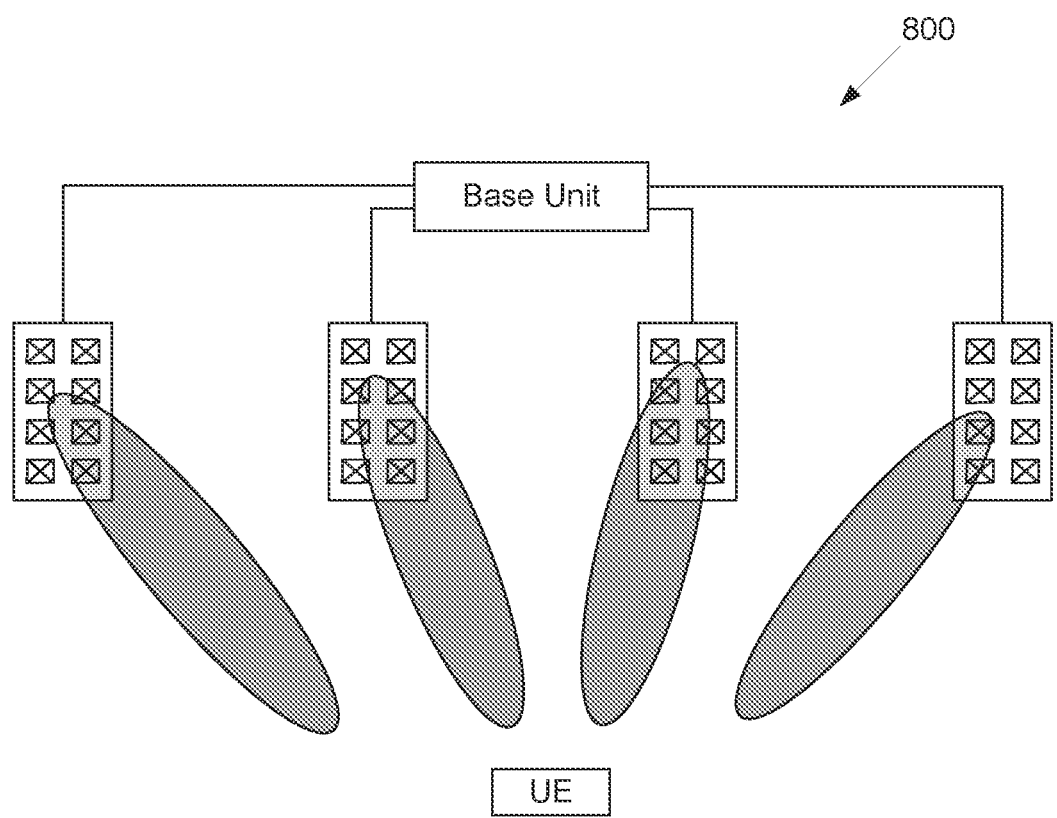
FIG. 8 illustrates an example of distributed MIMO according to embodiments of the present disclosure.

FIG. 8 illustrates an example of distributed MIMO 800 according to embodiments of the present disclosure. An embodiment of the distributed MIMO 800 shown in FIG. 8 is for illustration only.

In another embodiment, it is possible that multiple distributed antenna panels are connected to more than one base units, which communicates with each other and jointly supporting single antenna system. Although there is no restriction on the placement of multiple antenna panels of distributed MIMO system, it is also possible that some (or all) of multiple antenna panels can be collocated, for example, on a same building/stadium. In cases that multiple antenna panels are collocated (or even in the case that panels are not collocated), channel coefficients across the panels can have a certain level of correlation, and this can be exploited in CSI codebook design to compress the amount of CSI feedback for distributed MIMO.

Note that although low frequency band systems (sub-1 GHz band) are indicated as a motivation for distributed MIMO, the distributed MIMO technology is frequency-band-agnostic and can be useful in mid-(sub-6 GHz) and high-band (above-6 GHz) systems in addition to low-band (sub-1 GHz) systems.

Compared to low-frequency bands wherein most of the bands are operating with a frequency division duplexing (FDD), most of mid-frequency bands (above 1 GHz to sub-6 GHz) are designated to use a time division duplexing (TDD), and thus D-MIMO needs to be enhanced for TDD systems as well as FDD systems. For FDD systems, new CSI codebook design methods tailored for distributed MIMO are provided as illustrated in the U.S. patent application Ser. No. 17/549,658 as incorporated by reference herein.

In contrast with FDD systems where DL channels need to be measured at a UE side and reported to a NW using a CSI feedback framework for DL channel acquisition at the NW, in TDD scenarios, DL channels can be obtained at the NW via uplink SRS reception to estimate UL channels (thanks to DL-UL channel reciprocity in TDD). Thus, the NW can perform MU-MIMO transmission in a given set of frequency-and-time resources based on the DL channel information for multiple UEs without DL CSI feedback.

One of the key aspects in D-MIMO scenarios for MU-MIMO is that for a given UE, its serving RRHs can be a subset of RRHs in the D-MIMO NW whereas the other RRHs of the D-MIMO NW can be interfering RRHs that are serving other UEs. In this case, the interference signals from interfering RRHs (e.g., inter-RRH interference) to the UE can be dominated among all of the interference (i.e., intra/inter-cell interference), which could be a main bottleneck for the UE to have good quality of SINR.

One aspect in TDD D-MIMO scenarios is that channel information of interfering RRHs for a given UE can frequently be available at the NW, based on SRS reception, and the channel information of interfering RRHs can be used to efficiently schedule the UE if the NW is able to inform the UE of interference direction (e.g., channel covariances for interfering RRHs) which is determined by the NW when scheduling the UE. Note that if the UE is aware of statistic of inter-RRH interference channels (e.g., channel covariance for interfering RRHs), the UE can design advanced spatial beamforming or filtering such as MMSE beamforming/filtering by utilizing the statistic of inter-RRH interference channels (e.g., we call hereafter interference direction or space). For example, MMSE beamforming can be designed only when a statistic of interference channels is available at the UE. When the interfering RRHs for a given scheduled UE are determined by the NW and the channels associated with the interfering RRHs are available at the NW, the inter-RRH interference can be significantly reduced if the NW is able to indicate interference direction or space to the UE so that the UE can design advanced spatial beamforming using the information.

In the present disclosure, various components to alleviate inter-RRH interference by indicating desired signal/interference direction/space and/or desired signal/interference power/amplitude/level are provided. Although the terminology "inter-RRH interference" is used, it should not be limited to the case of inter-RRH interference only but can be interpreted as general interference if applicable.

In one embodiment I, a UE is configured with "inter-RRH interference component" which includes information I on inter-RRH interference, and the UE performs receive filtering/beamforming based on the configured information on inter-RRH interference. For example, information I can include interference space (a subspace spanned by interference vector directions) or direction and/or interference level/quality/power, which will be described specifically later. In one example, "inter-RRH interference component" can be configured via higher-layer parameter, MAC-CE or DCI. In another example, "inter-RRH interference component" can be configured periodically, semi-persistently, or aperiodically.

Figure 9:
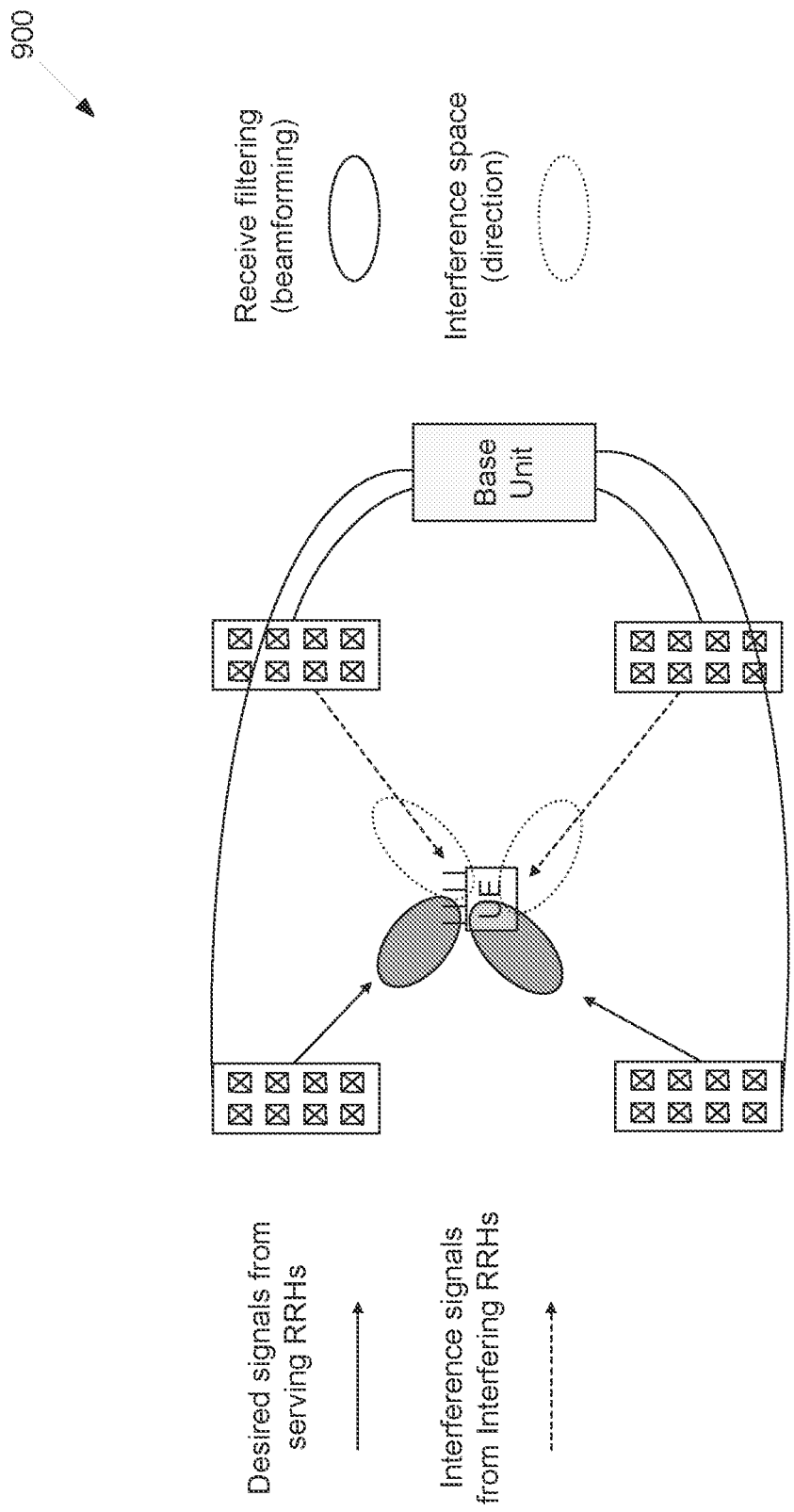
FIG. 9 illustrates an example of distributed MIMO scenario when a UE receives data from serving RRHs in an interference environment by non-serving RRHs according to embodiments of the present disclosure.

FIG. 9 illustrates an example of distributed MIMO scenario 900 when a UE receives data from serving RRHs in an interference environment by non-serving RRHs according to embodiments of the present disclosure. An embodiment of the distributed MIMO scenario 900 shown in FIG. 9 is for illustration only.

In one example, an inter-RRH interference scenario is provided as shown in FIG. 9, wherein a UE receives data via PDCCH/PDSCH from serving RRHs in an interference environment (dominated inter-RRH interference) by non-serving RRHs (that are supporting other UEs using, e.g., a same time-and-frequency resource set). Since the non-serving RRHs and serving RRHs for the UE are determined by the D-MIMO NW (based on DL channel information for the UE and other UEs), and the D-MIMO NW can identify expected inter-RRH interference to the UE, which can be different depending on UE's receiver (beamforming/filtering) processing.

For example, inter-RRH interference effect for the UE can be reduced if some information on inter-RRH interference is indicated to the UE and the UE utilizes the information when receiving DL data from the serving RRHs. As shown in FIG. 9, an interference space or direction can be indicated to the UE, and the UE designs receive beamforming/filtering considering the indicated interference space/direction when the UE receives PDCCH/PDSCH data.

Note that by facilitating inter-RRH interference alleviation at a UE side, the NW can determine more aggressive MCS selection, considering the inter-RRH interference alleviation, for DL transmission to the UE.

Figure 10:
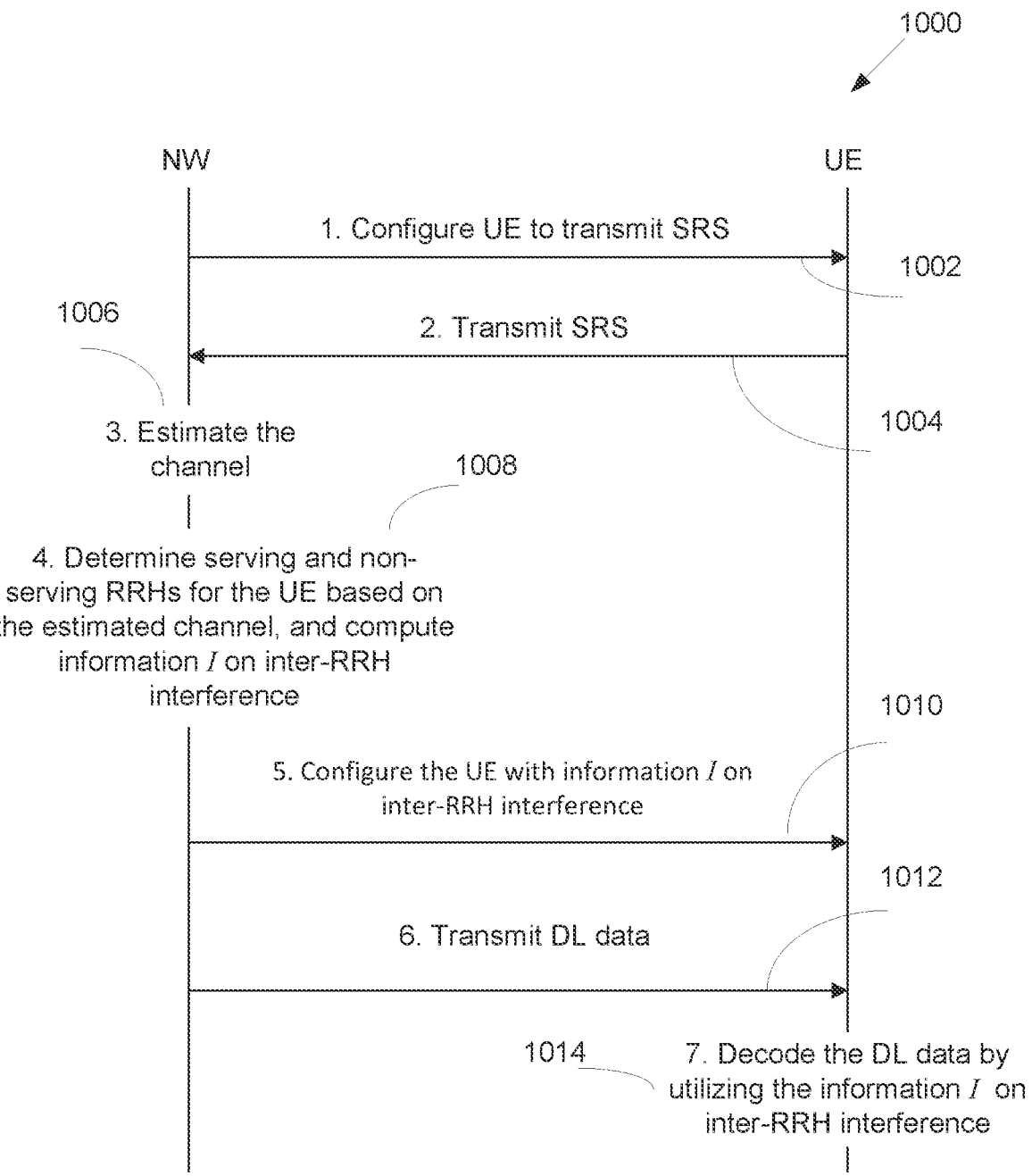
FIG. 10 illustrates a signaling flow of network (NW) and UE operation according to embodiments of the present disclosure.

FIG. 10 illustrates a signaling flow 1000 of NW and UE operation according to embodiments of the present disclosure. The signaling flow 1000 as may be performed by a UE (e.g., 111-116 as illustrated in FIG. 1) and a base station (e.g., 101-103 as illustrated in FIG. 1. An embodiment of the signaling flow 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIG. 10 shows a general flow chart for NW and UE operations to support components for alleviating inter-RRH interference at the UE. As shown in FIG. 10, the NW configures the UE to transmit SRS(s), and the UE transmits SRS(s) according to the configuration.

The NW estimates the uplink channel based on the SRS reception and infers the DL channel using DL-UL channel reciprocity. Then, the NW determines serving RRHs and non-serving RRHs for the UE based on the estimated (inferred) DL channel, and also computes information I on inter-RRH interference such as interference direction and/or level. The NW configures the UE with information I via PDCCH/PDSCH and transmits DL data according to the configuration. The UE then decodes the DL data by using the information I on inter-RRH interference.

As illustrated in FIG. 10, in step 1002, a network (NW), for example, a BS (101-103) as illustrated in FIG. 1, may configure a UE (e.g., 111-116 as illustrated in FIG. 1) to transmit SRS. In step 1004, the UE transmits the SRS to the NE. In step 1006, the NW may estimate the channel and determines, in step 1008, serving and non-serving RRHs for the UE based on the estimate channel. In step 1008, the NW further compute information I on inter-RRH interface. In step 1010, the NW may configure the UE with information I on the inter-RRH interference. In step 1012, the NE transmits DL data to the UE, and, in step 1014, the UE decodes the DL data by utilizing the information I on inter-RRH interference.

For example, if the UE is aware of statistics of inter-RRH interference signals (e.g., covariance matrix of inter-RRH interference signals R indicated by the NW), the UE is able to obtain high received SINR by MMSE receive beamforming/filtering. Several embodiments for information I are provided.

In one embodiment, information I includes one or multiple vectors $\{w_n\}_{n=0}^{N-1}$ that are selected from a set of vectors $\mathcal{M}$.

In one example, N is defined according to at least one of the following examples: (1) in one example, N is fixed, e.g., N=1, i.e., a single vector $w_0$ is configured/indicated; (2) in one example, N is configured via higher-layer parameter, MAC-CE, or DCI. In one example, N={1, 2, . . . , P−1}, where P is the number of antenna ports (i.e., number of SRS ports) at UE. In another example, N={1, 2}; and/or (3) in one example, N is defined as a function of the number of configured subbands (SBs). For example, N=K, where K is the number of configured SBs. In another example, N=pK, where p ∈{1, 2, . . . , P−1}.

In one example, $\mathcal{M}$ is a pre-defined set composed of P-dimensional vectors, where P is the number of antenna ports (i.e., number of SRS ports) at a UE: (1) in one example, $\mathcal{M}$ is a set comprised of basis vectors; and/or (2) in one example, $\mathcal{M}$ is a set comprised of (oversampled) DFT basis vectors. For example, a DFT basis vector can be expressed as $$p_i = \begin{bmatrix} 1 & e^{j\frac{2\pi i}{OP}} & \ldots & e^{j\frac{2\pi i(P-1)}{OP}} \end{bmatrix}^T,$$

where O is the oversampled factor and P is the number of antenna ports at the UE.

In one embodiment, information I includes one or multiple vectors $\{w_n\}_{n=0}^{N-1}$ whose elements are decomposed into phase and amplitude (or power) components, and they are selected from respective codebooks (or sets).

In one example, N is defined as discussed herein.

In one example, the codebook for the phase component is fixed, e.g., $n_p$-bit PSK codebook, where $n_p$-bit PSK codebook is defined as $$\Phi(n_p) = \left\{ e^{j\frac{2\pi(n-1)}{2^{n_p}}} : n = 0, 1, \ldots, 2^{n_p} - 1 \right\}.$$

In one example, $n_p=4$. In another example, the codebook for the phase component is configured via higher-layer parameter, e.g., from 3-bit PSK and 4-bit PSK codebook.

In one example, the codebook for the amplitude component is $n_a$-bit codebook composed of equidistant points in [0,1] in Y dB scale. For example, $n_a=4$ and Y=1.5, which corresponds to $$A(n_a, Y) = \left\{ 1, \left(\frac{1}{2}\right)^{\frac{1}{4}}, \left(\frac{1}{4}\right)^{\frac{1}{4}}, \ldots, \left(\frac{1}{2^{15}}\right)^{\frac{1}{2}} \right\}.$$

In another example, $n_a=3$ and Y=3, which corresponds to $$A(n_a, Y) = \left\{ 1, \left(\frac{1}{2}\right)^{\frac{1}{2}}, \left(\frac{1}{4}\right)^{\frac{1}{2}}, \ldots, \left(\frac{1}{2^7}\right)^{\frac{1}{2}} \right\}.$$

In one example, a strongest coefficient indicator (SCI) is used to indicate the strongest element of $w_n$. The element associated with the strongest element can be regarded as one, and thus the value is not needed to be indicated.

In one embodiment, information I includes interference (covariance) matrix, which can be represented as $R_D = U_D \Sigma_D U_D^H$, where $R_D = \Sigma_{d=0}^{D-1} \sigma_d^2 u_d u_d^H$ and D is a parameter that indicates a dimension of interference subspace: (1) in one example, D is fixed, e.g., D=1; and/or (2) in one example, D is configured via higher-layer parameter, MAC-CE or DCI, and $D \in \{1, 2\}$. In this case, one-bit parameter is needed. In another example, $D \in \{1, 2, \ldots, P-1\}$, where P is the number of antenna ports (the number of SRS ports) at the UE.

In one example, $u_d$ is selected from a set composed of unit-norm vectors.

In one example, each element of $u_d$ is decomposed into phase and amplitude components and they are selected from respective codebooks.

In one example, the codebook for the phase component is designed as discussed according to the examples described herein.

In one example, the codebook for the amplitude component is designed as discussed according to the examples described herein.

In one example, an SCI is used to indicate the strongest element of $u_d$, similar to the examples described herein.

In one example, $\sigma_d^2$ is defined based on signal-to-interference ratio (SIR) (or SINR) and selected from a pre-defined codebook (set). The NW can estimate an expected signal power at the UE and an (inter-RRH) expected interference power to the UE and compute the SIR (or SINR) based on those powers.

In one example, $\sigma_d^2$ is selected from a codebook composed of equidistance points in [a, b] in C dB scale, where, for example, $$a = \frac{1}{10^2},$$

b=10, C=3.

In another example, $\sigma_d^2$ is selected from a codebook composed of non-equidistance point in [a, b], for example which is given in the following TABLE 1.

TABLE 1

| | $\sigma_d^2$ (SIR or SINR) |
|---|---|
| index | $\sigma_d^2$ (SIR or SINR) |
| 0 | ≥9 dB |
| 1 | 6 dB |
| 2 | 3 dB |
| 3 | 0 dB |
| 4 | −1.5 dB |
| 5 | −3 dB |
| 6 | −4.5 dB |
| 7 | −6 dB |
| 8 | −7.5 dB |
| 9 | −9 dB |
| 10 | −10.5 dB |
| 11 | −12 dB |
| 12 | −13.5 dB |
| 13 | −15 dB |
| 14 | −16.5 dB |
| 15 | ≤−18 dB |

Note that designing receive filtering/beamforming to be nearly orthogonal (or in an MMSE manner) to the space of interference signals becomes critical to have reasonable received SINR when there exist strong interference signals. Therefore, a codebook composed of non-equidistance points in a given range for $\sigma_d^2$ could be efficient, as shown in TABLE 1.

In one example, $\sigma_d^2$ for d=0, . . . , D−1 is normalized by the largest $\sigma_d^2$ and each normalized $\sigma_d^2$ is indicated to the UE.

In one example, $\sigma_0^2$ is the largest value and is selected from a first codebook, e.g., the SIR table above, and each normalized $\sigma_d^2$ for d=1, . . . , D−1 is selected from a second codebook, e.g., composed of equidistant points in [0, 1] in 1.5 dB or 3 dB scale.

In one example, $\sigma_0^2$ is the largest value and is set to one, hence not indicated to the UE, and each normalized $\sigma_d^2$ for d=1, . . . , D−1 is selected from a codebook, e.g., composed of equidistant points in [0, 1] in 1.5 dB or 3 dB scale.

In another example, $\sigma_d^2$ is defined based on (inter-RRH) interference power/level and selected from a pre-defined codebook (or set) similar to examples described herein.

In one embodiment, a UE can be configured with a parameter (or indicator) to enable or disable $\sigma_d^2$ via higher-layer parameter (RRC), MAC-CE, or DCI. If the parameter indicates "disable $\sigma_d^2$," $\sigma_d^2$ is not indicated to the UE. If the parameter indicates "enable $\sigma_d^2$," $\sigma_d^2$ is indicated to the UE. Note that when an expected interference level is too high (i.e., SIR is too low), zero-forcing (ZF) receive beamforming/filtering is near optimal. Since the strength information $\sigma_d^2$ on interference is not needed (only direction information $u_d$ is needed) when designing ZF receiver beamforming, this parameter can be used to disable, when the NW expects that the expected interference to the UE may be larger.

In one example, when the parameter is indicated to disable $\sigma_d^2$ to a UE, the UE designs ZF beamforming/filtering using $\{u_d\}$ to receive DL data via PDCCH/PDSCH.

In one example, when the parameter is indicated to disable $\sigma_d^2$ to a UE, the UE does not have to design ZF beamforming/filtering. In this case, the UE may utilize its own information for interference or the previous information on $\sigma_d^2$ if the UE designs beamforming/filtering (such as MMSE beamforming) other than ZF beamforming.

In one example, when the parameter is indicated to disable $\sigma_d^2$ to a UE, a second parameter can be used to indicate to force the UE to design ZF or not. For example, if the second parameter indicates to design ZF, the UE may design ZF beamforming when receiving configured DL data. Otherwise, the UE can design its own preferred beamforming.

In one embodiment, $\sigma_d^2$ and $u_d$ can be indicated/configured via different mediums, according to at least one of the following examples: (1) in one example, (as, $\sigma_d^2$, $u_d$)=(RRC, RRC); (2) in one example, ($\sigma_d^2$, $u_d$)=(RRC, MAC-CE); (3) in one example, ($\sigma_d^2$, $u_d$)=(RRC, DCI); (3) in one example, ($\sigma_d^2$, $u_d$)=(MAC-CE, RRC); (4) in one example, ($\sigma_d^2$, $u_d$)=(MAC-CE, MAC-CE); (5) in one example, ($\sigma_d^2$, $u_d$)=(MAC-CE, DCI); (6) in one example, ($\sigma_d^2$, $u_d$)=(DCI, RRC); (7) in one example, ($\sigma_d^2$, $u_d$)=(DCI, MAC-CE); and/or (8) in one example, ($\sigma_d^2$, $u_d$)=(DCI, DCI).

In one embodiment, $\sigma_d^2$ and $u_d$ can be periodically, semi-persistently, or aperiodically indicated/configured.

In one embodiment, multiple covariance matrices (i.e., $\{R_{D,m}\}_{m=0}^{M-1}$) are configured to a UE via higher-layer parameter (e.g., RRC), and some of them are indicated to the UE via lower-layer parameter (e.g., MAC-CE or DCI): (1) in one example, M is predetermined and fixed, e.g., M=2; (2) in one example, M is configured and selected from M=$\{2, 4, 6, 8\}$, or $\{1, 2, 3, 4\}$, or $\{1, 2\}$, or $\{2, 3\}$; and/or (3) in one example, M=$N_{RRH}$, where $N_{RRH}$ is the number of RRHs in a D-MIMO network.

In one example, a covariance matrix is configured for each interference covariance ID, e.g., as shown in the following TABLE 2.

TABLE 2

| Interference covariance ID | Covariance matrix |
|---|---|
| 0 | $R_{D,0} = U_{D,0}\Sigma_{D,0}U_{D,0}^H$ |
| 1 | $R_{D,1} = U_{D,1}\Sigma_{D,1}U_{D,1}^H$ |
| . | . |
| . | . |
| . | . |
| M − 1 | $R_{D,M-1} = U_{D,M-1}\Sigma_{D,M-1}U_{D,M-1}^H$ |

Each covariance can be indicated to the UE via higher-layer parameter, similar to the relevant embodiments/examples discussed herein.

In one example, a bit-map indicator with size M is used to indicate some or all of the configured covariance matrices. For example, from the most significant bit (MSB) to the least significant bit (LSB), the M bits correspond to interference covariance IDs from 0 to M−1. In one example, the UE utilizes a total interference covariance matrix by computing: $R_D = \Sigma_{m \in S} R_{D,m}$, where S is the set of the covariance IDs corresponding to is in the bit-map indicator with size M.

In one example, information I includes interference (covariance) matrix, which can be represented as $R_D = U_D \Sigma_D U_D^H$, where $R_D = \Sigma_{d=0}^{D-1} c_d u_d u_d^H$ and D is a parameter that indicates a dimension of interference subspace, where $U_D$ is an orthogonal DFT basis composed of D DFT basis vectors $\{u_d\}$ and $c_d$ is a complex coefficient: (1) in one example, D is fixed, e.g., D=1; and/or (2) in one example, D is configured via higher-layer parameter, MAC-CE or DCI, and D $\in \{1, 2\}$. In this case, one-bit parameter is needed. In another example, D $\in \{1, 2, \ldots, P-1\}$, where P is the number of antenna ports (the number of SRS ports) at the UE.

In one example, $u_d$ is selected from a set (codebook) $\mathcal{M}$. For example, $\mathcal{M}$ comprises of oversampled DFT basis vectors, where an oversampled DFT basis vector can be expressed as $$p_i = \begin{bmatrix} 1 & e^{j\frac{2\pi i}{OP}} & \ldots & e^{j\frac{2\pi i(P-1)}{OP}} \end{bmatrix}^T,$$

where O is the oversampled factor and P is the number of antenna ports at the UEs: (1) in one example, O is predetermined or fixed to 1 or 2; and/or (2) in one example, O is configured via higher-parameter and selected from, e.g., O $\in \{1, 2\}$.

In one example, $c_d$ is decomposed into amplitude and phase components and they are selected from respective codebooks: (1) in one example, the phase of $c_d$ is selected from an $n_p$-bit PSK codebook, where an $n_p$-bit PSK codebook is defined as $$\Phi(n_p) = \left\{ e^{\frac{j2\pi(n-1)}{2^{n_p}}} : n = 0, 1, \ldots, 2^{n_p} - 1 \right\}.$$

In one example, $n_p$=4. In another example, the codebook for the phase component is configured via higher-layer parameter, e.g., from 3-bit PSK and 4-bit PSK codebook; and/or (2) in one example, the amplitude of $c_d$ is selected from an $n_a$-bit codebook composed of equidistant points in [0, 1] in Y dB scale. For example, $n_a$=4 and Y=1.5. In another example, $n_a$=3 and Y=3.

In one example, $c_d$ for d=0, ..., P−1 is normalized by the strongest $c_d$ and each normalized $c_d$ is indicated to the UE: (1) in one example, $c_0$ is the largest value and is selected from a codebook, e.g., the SIR table above, and each normalized $c_d$ for d=1, ..., D−1 is selected according to examples described herein; and/or (2) in one example, $c_0$ is the largest value and is set to one, hence not indicated to the UE, and each normalized $c_d$ for d=1, ..., D−1 is selected according to examples described herein.

In embodiment, information I includes interfering DMRS configuration(s) for UE to measure interfering DMRS to be transmitted from non-serving RRHs.

In one example, time-and-frequency resources conveying interfering DMRS(s) are the same as those conveying DMRS transmitted from serving RRHs. In this case, sequence (scramble) IDs between the interfering and desired DMRSs may be different, and thus the NW configures scramble ID(s) for the interfering DMRS(s) via higher-layer parameter, MAC-CE, or DCI.

In one example, the NW configures B scramble IDs for interfering DMRSs via higher-layer parameter, and the NW indicates some of B scramble IDs for UE to measure interfering DMRSs using a bit-map indicator with size B.

In one example, time-and-frequency resources conveying interfering DMRS(s) can be differently configured from those conveying DMRS transmitted from serving RRHs. In this case, sequence (scramble) IDs between the interfering and desired DMRSs can be the same or different.

In one example, an individual DMRS configuration (e.g., including time-and-frequency resource information and scramble ID) for each interfering DMRS is configured via higher-layer parameter, MAC-CE, or DCI.

In one example, an individual DMRS configuration which does not include scramble ID for each interfering DMRS is configured via higher-layer parameter, MAC-CE, or DCI. (This is for the case where a same scramble ID is used for all interfering DMRS and desired signal DMRS.)

In one example, the NW configures B DMRS configurations for interfering DMRSs via higher-layer parameter, and the NW indicates some of B DMRSs for UE to measure interfering DMRSs using a bit-map indicator with size B.

In one embodiment, a UE is configured with "desired signal component" which includes information S on desired signal, and the UE performs receive filtering/beamforming based on the configured information S on desired signal. For example, information S can include signal space (a subspace spanned by desired signal vector directions) or direction and/or signal level/quality/power, which will be described specifically later. In one example, "desired signal component" can be configured via higher-layer parameter, MAC-CE or DCI. In another example, "desired signal component" can be configured periodically, semi-persistently, or aperiodically.

Instead of indicating information on "inter-RRH interference component" provided in embodiment 1 and embodiment 2 provides a framework to indicate information on "desired signal component." In other words, information directly related to "desired signal" transmitted from serving RRHs is indicated to UE to alleviate inter-RRH interference at the UE side.

Figure 11:
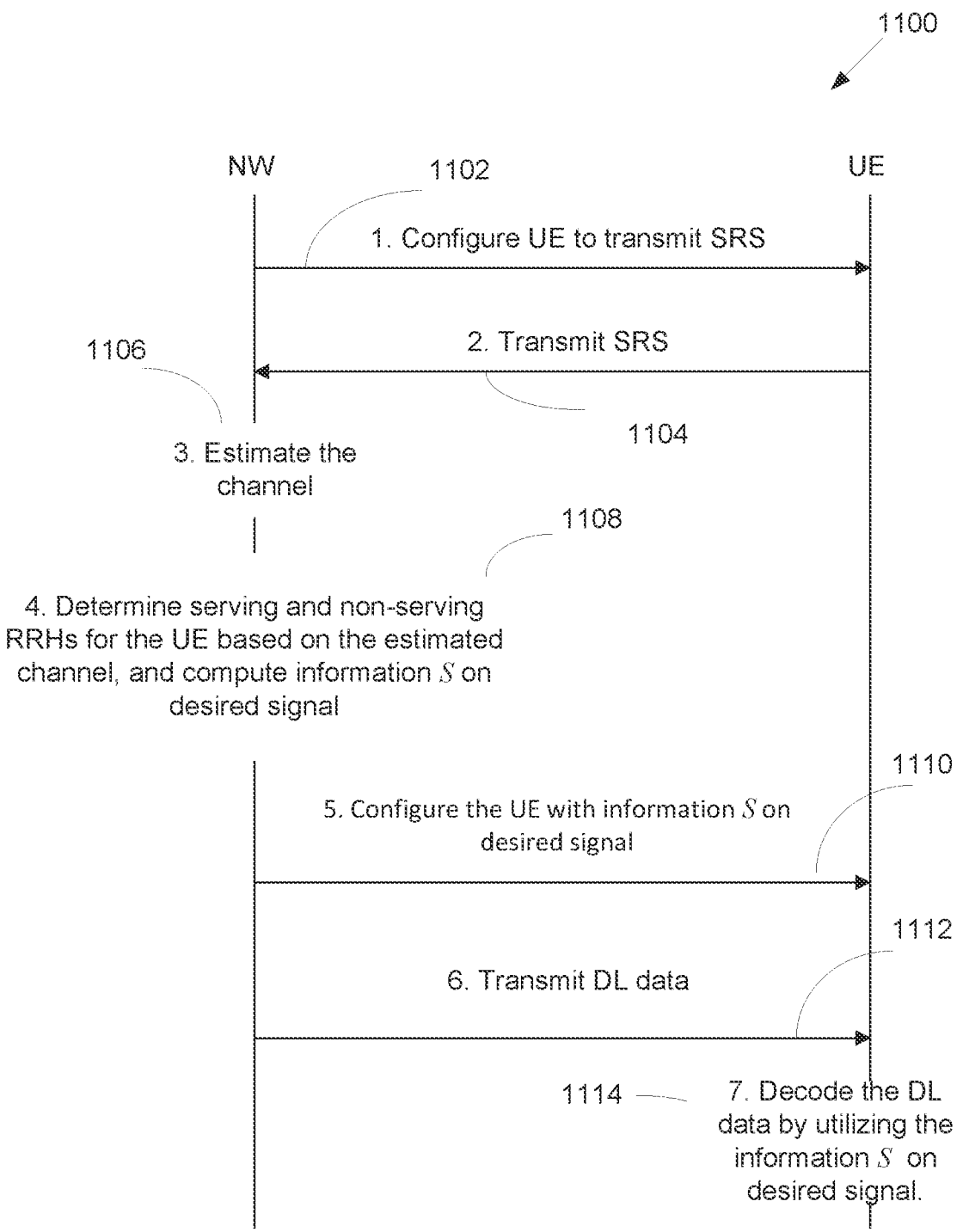
FIG. 11 illustrates another signaling flow of NW and UE operation according to embodiments of the present disclosure.

FIG. 11 illustrates another signaling flow 1100 of NW and UE operation according to embodiments of the present disclosure. The signaling flow 1100 as may be performed by a UE (e.g., 111-116 as illustrated in FIG. 1) and a base station (e.g., 101-103 as illustrated in FIG. 1. An embodiment of the signaling flow 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 shows a general flow chart for NW and UE operations using embodiment 2 to alleviate inter-RRH interference at the UE. As shown in FIG. 11, the NW configures the UE to transmit SRS(s), and the UE transmits SRS(s) according to the configuration. The NW estimates the uplink channel based on the SRS reception and infers the DL channel using DL-UL channel reciprocity. Then, the NW determines serving RRHs and non-serving RRHs for the UE based on the estimated (inferred) DL channel, and also computes information S on desired signal such as desired signal direction/space and/or level/quality/power. The NW configures the UE with information S via PDCCH/PDSCH and transmits DL data according to the configuration. The UE then decodes the DL data by using the information S on desired signal.

As illustrated in FIG. 11, in step 1102, the NW (101-103 as illustrated in FIG. 1) may configure the UE (e.g., 111-116 as illustrated in FIG. 1) to transmit the SRS. In step 1104, the UE transmits the SRS to the NW. In step 1106, the NW estimates the channel and determines, in step 1108, serving and non-serving RRHs for the UE based on the estimated channel, and compute information S on desired signal. In step 1110, the NW configure the UE with information S on desired signal. In step 1112, the NW transmits the DL date to the UE. In step 1114, the UE decodes the DL data by utilizing the information S on desired signal.

For example, if the UE is aware of statistics of desired signals (e.g., covariance matrix of desired signal $R_s$ indicated by the NW), the UE is able to obtain high received SINR by MMSE receive beamforming/filtering using the information. Several embodiments for information S are provided.

In one embodiment, information S includes one or multiple vectors $\{s_n\}_{n=0}^{N-1}$ that are selected from a set of vectors $\mathcal{M}$.

In one example, N is defined according to at least one of the following examples: (1) in one example, N is fixed, e.g., N=1, i.e., a single vector $s_0$ is configured/indicated; (2) in one example, N is configured via higher-layer parameter, MAC-CE, or DCI. In one example, N={1, 2, . . . , P–1}, where P is the number of antenna ports (i.e., number of SRS ports) at UE. In another example, N={1,2}; and/or (3) in one example, N is defined as a function of the number of configured subbands (SBs). For example, N=K, where K is the number of configured SBs. In another example, N=pK, where $p \in \{1, 2, \ldots, P-1\}$.

In one example, $\mathcal{M}$ is a pre-defined set composed of P-dimensional vectors, where P is the number of antenna ports (i.e., number of SRS ports) at a UE: (1) in one example, $\mathcal{M}$ is a set comprised of basis vectors; and/or (2) in one example, $\mathcal{M}$ is a set comprised of (oversampled) DFT basis vectors. For example, a DFT basis vector can be expressed as $$p_i = \begin{bmatrix} 1 & e^{j\frac{2\pi i}{OP}} & \ldots & e^{j\frac{2\pi i(P-1)}{OP}} \end{bmatrix}^T,$$

where O is the oversampled factor and P is the number of antenna ports at the UE.

In one embodiment, information S includes one or multiple vectors $\{s_n\}_{n=0}^{N-1}$ whose elements are decomposed into phase and amplitude (or power) components, and they are selected from respective codebooks (or sets).

In one example, N is defined according to the examples described herein.

In one example, the codebook for the phase component is fixed, e.g., $n_p$-bit PSK codebook, where $n_p$-bit PSK codebook is defined as $$\Phi(n_p) = \left\{ e^{\frac{j2\pi(n-1)}{2^{n_p}}} : n = 0, 1, \ldots, 2^{n_p} - 1 \right\}.$$

In one example, $n_p=4$. In another example, the codebook for the phase component is configured via higher-layer parameter, e.g., from 3-bit PSK and 4-bit PSK codebook.

In one example, the codebook for the amplitude component is $n_a$-bit codebook composed of equidistant points in [0,1] in Y dB scale. For example, $n_a=4$ and $Y=1.5$, which corresponds to $$A(n_a, Y) = \left\{1, \left(\frac{1}{2}\right)^{\frac{1}{4}}, \left(\frac{1}{4}\right)^{\frac{1}{4}}, \ldots, \left(\frac{1}{2^{15}}\right)^{\frac{1}{4}}\right\}.$$

In another example, $n_a=3$ and $Y=3$, which corresponds to $$A(n_a, Y) = \left\{1, \left(\frac{1}{2}\right)^{\frac{1}{2}}, \left(\frac{1}{4}\right)^{\frac{1}{2}}, \ldots, \left(\frac{1}{2^{7}}\right)^{\frac{1}{2}}\right\}.$$

In one example, an SCI is used to indicate the strongest element of $s_n$. The element associated with the strongest element can be regarded as one, and thus the value is not needed to be indicated.

In one embodiment, information S includes desired signal covariance matrix, which can be represented as $R_{s,D}=U_{s,D}\Sigma_{s,D}U_{s,D}^H$, where $R_{s,D}=\Sigma_{d=0}^{D-1}\sigma_d^2 u_{s,d}u_{s,d}^H$ and D is a parameter that indicates a dimension of desired signal subspace: (1) in one example, D is fixed, e.g., D=1; and/or (2) in one example, D is configured via higher-layer parameter, MAC-CE or DCI, and $D \in \{1,2\}$. In this case, one-bit parameter is needed. In another example, $D \in \{1, 2, \ldots, P-1\}$, where P is the number of antenna ports (the number of SRS ports) at the UE.

In one example, $U_{s,d}$ is selected from a set composed of unit-norm vectors.

In one example, each element of $u_{s,d}$ is decomposed into phase and amplitude components and they are selected from respective codebooks.

In one example, the codebook for the phase component is designed according to the examples described herein.

In one example, the codebook for the amplitude component is designed according to the examples described herein.

In one example, an SCI is used to indicate the strongest element of $u_{s,d}$, similar to the examples described herein.

In one example, $\sigma_d^2$ is defined based on signal-to-interference ratio (SIR) (or SINR) and selected from a pre-defined codebook (set). The NW can estimate an expected signal power at the UE and an (inter-RRH) expected interference power to the UE and compute the SIR (or SINR) based on those powers.

In one example, $\sigma_d^2$ is selected from a codebook composed of equidistance points in [a, b] in C dB scale, where, for example, $$a = \frac{1}{10^2},$$

b=10, C=3.

In another example, $\sigma_d^2$ is selected from a codebook composed of non-equidistance point in [a, b], for example which is given in the following TABLE 3.

TABLE 3

| index | $\sigma_d^2$ (SIR or SINR) |
|---|---|
| 0 | ≥9 dB |
| 1 | 6 dB |
| 2 | 3 dB |
| 3 | 0 dB |
| 4 | −1.5 dB |
| 5 | −3 dB |
| 6 | −4.5 dB |
| 7 | −6 dB |
| 8 | −7.5 dB |
| 9 | −9 dB |
| 10 | −10.5 dB |
| 11 | −12 dB |
| 12 | −13.5 dB |
| 13 | −15 dB |
| 14 | −16.5 dB |
| 15 | ≤−18 dB |

In one example, $\sigma_d^2$ for $d=0, \ldots, D-1$ is normalized by the largest $\sigma_d^2$ and each normalized $\sigma_d^2$ is indicated to the UE: (1) in one example, $\sigma_0^2$ is the largest value and is selected from a first codebook, e.g., the SIR table above, and each normalized $\sigma_d^2$ for $d=1, \ldots, D-1$ is selected from a second codebook, e.g., composed of equidistant points in [0, 1] in 1.5 dB or 3 dB scale; and/or (2) in one example, $\sigma_0^2$ is the largest value and is set to one, hence not indicated to the UE, and each normalized $\sigma_d^2$ for $d=1, \ldots, D-1$ is selected from a codebook, e.g., composed of equidistant points in [0, 1] in 1.5 dB or 3 dB scale.

In another example, $\sigma_d^2$ is defined based on desired signal power/level/quality and selected from a pre-defined codebook (or set) similar to examples described herein.

In one embodiment, a UE can be configured with a parameter (or indicator) to enable or disable $\sigma_d^2$ via higher-layer parameter (RRC), MAC-CE, or DCI. If the parameter indicates "disable $\sigma_d^2$," $\sigma_d^2$ is not indicated to the UE. If the parameter indicates "enable $\sigma_d^2$," $\sigma_d^2$ is indicated to the UE.

In one embodiment, $\sigma_d^2$ and $u_{s,d}$ can be indicated/configured via different mediums, according to at least one of the following examples: (1) in one example, $(\sigma_d^2, u_{s,d})$=(RRC, RRC); (2) in one example, $(\sigma_d^2, u_{s,d})$=(RRC, MAC-CE); (3) in one example, $(\sigma_d^2, u_{s,d})$=(RRC, DCI); (4) in one example, $(\sigma_d^2, u_{s,d})$=(MAC-CE, RRC); (5) in one example, $(\sigma_d^2, u_{s,d})$=(MAC-CE, MAC-CE); (6) in one example, $(\sigma_d^2, u_{s,d})$=(MAC-CE, DCI); (7) in one example, $(\sigma_d^2, u_{s,d})$=(DCI, RRC); (8) in one example, $(\sigma_d^2, u_{s,d})$=(DCI, MAC-CE); and/or (9) in one example, $(\sigma_d^2, u_{s,d})$=(DCI, DCI).

In one embodiment, $\sigma_d^2$ and $u_{s,d}$ can be periodically, semi-persistently, or aperiodically indicated/configured.

In one embodiment, multiple covariance matrices (i.e., $\{R_{s,D,m}\}_{m=0}^{M-1}$) are configured to a UE via higher-layer parameter (e.g., RRC), and some of them are indicated to the UE via lower-layer parameter (e.g., MAC-CE or DCI): (1) in one example, M is predetermined and fixed, e.g., M=2; (2) in one example, M is configured and selected from M={2, 4, 6, 8}, or {1, 2, 3, 4}, or {1, 2}, or {2, 3}; and/or (3) in one example, M=$N_{RRH}$, where $N_{RRH}$ is the number of RRHs in a D-MIMO network.

In one example, a covariance matrix is configured for each desired signal covariance ID, e.g., as shown in the following TABLE 4.

TABLE 4

Covariance matrix

| Desired signal covariance ID | Covariance matrix |
|---|---|
| 0 | $R_{s,D,0} = U_{s,D,0} \Sigma_{s,D,0} U_{s,D,0}^H$ |
| 1 | $R_{s,D,1} = U_{s,D,1} \Sigma_{s,D,1} U_{s,D,1}^H$ |
| . | . |
| . | . |
| . | . |
| M − 1 | $R_{s,D,M-1} = U_{s,D,M-1} \Sigma_{s,D,M-1} U_{s,D,M-1}^H$ |

Each covariance can be indicated to the UE via higher-layer parameter, similar to the relevant embodiments/examples under embodiments described herein.

In one example, a bit-map indicator with size M is used to indicate some or all of the configured covariance matrices. For example, from the most significant bit (MSB) to the least significant bit (LSB), the M bits correspond to desired signal covariance IDs from 0 to M−1. In one example, the UE utilizes a total desired signal covariance matrix by computing: $R_{s,D} = \Sigma\Sigma_{m \in S} R_{s,D,m}$, where S is the set of the covariance IDs corresponding to 1s in the bit-map indicator with size M.

In one example, information S includes desired signal covariance matrix, which can be represented as $R_{s,D} = U_{s,D}\Sigma_{s,D}U_{s,D}^H$, where $R_{s,D} = \Sigma_{d=0}^{D-1} c_{s,d} u_{s,d} u_{s,d}^H$ and D is a parameter that indicates a dimension of desired signal subspace, where $U_{s,D}$ is an orthogonal DFT basis composed of D DFT basis vectors $\{u_{s,d}\}$ and $C_{s,d}$ is a complex coefficient: (1) in one example, D is fixed, e.g., D=1; and/or (2) in one example, D is configured via higher-layer parameter, MAC-CE or DCI, and D ∈ {1, 2}. In this case, one-bit parameter is needed. In another example, D ∈ {1, 2, . . . , P−1}, where P is the number of antenna ports (the number of SRS ports) at the UE.

In one example, $u_{s,d}$ is selected from a set (codebook) $\mathcal{M}$. For example, $\mathcal{M}$ comprises of oversampled DFT basis vectors, where an oversampled DFT basis vector can be expressed as $$p_i = \begin{bmatrix} 1 & e^{j\frac{2\pi i}{OP}} & \ldots & e^{j\frac{2\pi i(P-1)}{OP}} \end{bmatrix}^T,$$

where O is the oversampled factor and P is the number of antenna ports at the UEs: (1) in one example, O is predetermined or fixed to 1 or 2; and/or (2) in one example, O is configured via higher-parameter and selected from, e.g., O ∈ {1, 2}.

In one example, $c_{s,d}$ is decomposed into amplitude and phase components and they are selected from respective codebooks.

In one example, the phase of $c_{s,d}$ is selected from an $n_p$-bit PSK codebook, where an $n_p$-bit PSK codebook is defined as $$\Phi(n_p) = \left\{ e^{\frac{j2\pi(n-1)}{2^{n_p}}} : n = 0, 1, \ldots, 2^{n_p} - 1 \right\}.$$

In one example, $n_p$=4. In another example, the codebook for the phase component is configured via higher-layer parameter, e.g., from 3-bit PSK and 4-bit PSK codebook.

In one example, the amplitude of $c_d$ is selected from an $n_a$-bit codebook composed of equidistant points in [0, 1] in Y dB scale. For example, $n_a$=4 and Y=1.5. In another example, $n_a$=3 and Y=3.

In one example, $c_{s,d}$ for d=0, . . . , P−1 is normalized by the strongest $c_{s,d}$ and each normalized $c_{s,d}$ is indicated to the UE: (1) in one example, $c_{s,0}$ is the largest value and is selected from a codebook, e.g., the SIR table above, and each normalized $c_{s,d}$ for d=1, . . . , D−1 is selected according to examples described herein; and/or (2) in one example, $c_{s,0}$ is the largest value and is set to one, hence not indicated to the UE, and each normalized $c_{s,d}$ for d=1, . . . , D−1 is selected according to examples described herein.

Any of the above variation embodiments/examples can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
 a transceiver configured to receive configuration information about I, wherein:
  I is interference information for interfering $N_{int}$ remote radio heads (RRHs), where $N_{int} \leq N-1$, and
  the configuration information indicates a number of RRHs, N>1; and
 a processor operably coupled to the transceiver, the processor configured to, based on the interference information I, determine a downlink (DL) spatial filter using P antenna ports, where P>1,
 wherein the transceiver is further configured to receive DL data using the determined DL spatial filter.

2. The UE of claim 1, wherein the interference information I includes an interference covariance matrix $R_D$ for the interfering $N_{int}$ RRHs, where $R_D = \Sigma_{d=0}^{D-1} \sigma_d^2 u_d u_d^H$, D is a parameter that indicates a dimension of interference subspace, and D≤P−1.

3. The UE of claim 2, wherein:
 each element of $u_d$ is decomposed into phase and amplitude components that are selected from respective codebooks,
 the codebook for the phase component is an $n_p$-bit phase-shift keying (PSK) codebook, where $n_p$-bit PSK codebook is defined as $$\Phi(n_p) = \left\{ e^{\frac{j2\pi(n-1)}{2^{n_p}}} : n = 0, 1, \ldots, 2^{n_p} - 1 \right\},$$

and
 the codebook for the amplitude component is an $n_a$-bit codebook composed of equidistant points in [0,1] in Y decibel (dB) scale.

4. The UE of claim 2, wherein:
$\sigma_d^2$ is defined based on a signal-to-interference ratio (SIR) and selected from a predefined codebook, and
the predefined codebook includes equidistant points in [a, b] in C decibel (dB) scale or is composed of non-equidistant point in [a, b].

5. The UE of claim 2, wherein the interference information I further includes a parameter to enable or disable $\sigma_d^2$, where $\sigma_d^2$ is included in I only when the parameter is set to enable.

6. The UE of claim 1, wherein the interference information I includes multiple interference covariance matrices $\{R_{D,m}\}_{m=0}^{M-1}$, where $R_{D,m}=\Sigma_{d=0}^{D-1}\sigma_{d,m}^2 u_{d,m} u_{d,m} H$, D is a parameter that indicates a dimension of interference subspace, and D≤P−1.

7. The UE of claim 6, wherein the transceiver is further configured to receive a subset of the multiple interference covariance matrices via a medium access control-control element (MAC-CE) or downlink control information (DCI).

8. A base station (BS) comprising:
a transceiver configured to transmit configuration information about I, wherein:
I is interference information for interfering $N_{int}$ remote radio heads (RRHs), where $N_{int}$≤N−1, and
the configuration information indicates a number of RRHs, N>1; and
a processor operably coupled to the transceiver, the processor configured to, based on the interference information I, determine a downlink (DL) spatial filter using P antenna ports, where P>1,
wherein the transceiver is further configured to transmit DL data for reception according to the determined DL spatial filter.

9. The BS of claim 8, wherein the interference information I includes an interference covariance matrix $R_D$ for the interfering $N_{int}$ RRHs, where $R_D=\Sigma_{d=0}^{D-1}\sigma_d^2 u_d u_d^H$, D is a parameter that indicates a dimension of interference subspace, and D≤P−1.

10. The BS of claim 9, wherein:
each element of $u_d$ is decomposed into phase and amplitude components that are selected from respective codebooks,
the codebook for the phase component is an $n_p$-bit phase-shift keying (PSK) codebook, where $n_p$-bit PSK codebook is defined as $$\Phi(n_p) = \left\{ e^{\frac{j2\pi(n-1)}{2^{n_p}}} : n = 0, 1, \ldots, 2^{n_p} - 1 \right\},$$

and
the codebook for the amplitude component is an $n_a$-bit codebook composed of equidistant points in [0,1] in Y decibel (dB) scale.

11. The BS of claim 9, wherein:
$\sigma_d^2$ is defined based on a signal-to-interference ratio (SIR) and selected from a predefined codebook, and
the predefined codebook includes equidistant points in [a, b] in C decibel (dB) scale or is composed of non-equidistant point in [a, b].

12. The BS of claim 9, wherein the interference information I further includes a parameter to enable or disable $\sigma_d^2$, where $\sigma_d^2$ is included in I only when the parameter is set to enable.

13. The BS of claim 8, wherein the interference information I includes multiple interference covariance matrices $\{R_{D,m}\}_{m=0}^{M-1}$, where $R_{D,m}=\Sigma_{d=0}^{D-1}\sigma_{d,m}^2 u_{d,m} u_{d,m}^H$, D is a parameter that indicates a dimension of interference subspace, and D≤P−1.

14. The BS of claim 13, wherein the transceiver is further configured to transmit a subset of the multiple interference covariance matrices via a medium access control-control element (MAC-CE) or downlink control information (DCI).

15. A method for operating a user equipment (UE), the method comprising:
receiving configuration information about I, wherein:
I is interference information for interfering $N_{int}$ remote radio heads (RRHs), where $N_{int}$≤N−1, and
the configuration information indicates a number of RRHs, N>1;
determining, based on the interference information I, a downlink (DL) spatial filter using P antenna ports, where P>1; and
receiving DL data using the determined DL spatial filter.

16. The method of claim 15, wherein the interference information I includes an interference covariance matrix $R_D$ for the interfering $N_{int}$ RRHs, where $R_D=\Sigma_{d=0}^{D-1}\sigma_d^2 u_d u_d^H$, D is a parameter that indicates a dimension of interference subspace, and D≤P−1.

17. The method of claim 16, wherein:
each element of $u_d$ is decomposed into phase and amplitude components that are selected from respective codebooks,
the codebook for the phase component is an $n_p$-bit phase-shift keying (PSK) codebook, where $n_p$-bit PSK codebook is defined as $$\Phi(n_p) = \left\{ e^{\frac{j2\pi(n-1)}{2^{n_p}}} : n = 0, 1, \ldots, 2^{n_p} - 1 \right\},$$

and
the codebook for the amplitude component is an $n_a$-bit codebook composed of equidistant points in [0,1] in Y decibel (dB) scale.

18. The method of claim 16, wherein:
$\sigma_d^2$ is defined based on a signal-to-interference ratio (SIR) and selected from a predefined codebook, and
the predefined codebook includes equidistant points in [a, b] in C decibel (dB) scale or is composed of non-equidistant point in [a, b].

19. The method of claim 16, wherein the interference information I further includes a parameter to enable or disable $\sigma_d^2$, where $\sigma_d^2$ is included in I only when the parameter is set to enable.

20. The method of claim 15, wherein:
the interference information I includes multiple interference covariance matrices $\{R_{D,m}\}_{m=0}^{M-1}$, where $R_{D,m}=\Sigma_{d=0}^{D-1}\sigma_{d,m}^2 u_{d,m} u_{d,m}^H$, D is a parameter that indicates a dimension of interference subspace, and D≤P−1, and
the method further comprises receiving a subset of the multiple interference covariance matrices via a medium access control-control element (MAC-CE) or downlink control information (DCI).

* * * * *